United States Patent [19]
Marks et al.

[11] Patent Number: 5,641,009
[45] Date of Patent: Jun. 24, 1997

[54] CHARGING CAVITIES

[75] Inventors: Kevin Trevor Marks, Crick; Ronald Henry Turner, Stretton-on-Dunsmore; Mark Philip Dyson; Andrew David Sutton, both of Marple, all of England

[73] Assignee: GB Tools & Components Exports Ltd., Manchester, England

[21] Appl. No.: 495,491

[22] PCT Filed: Jan. 10, 1994

[86] PCT No.: PCT/GB94/00038

§ 371 Date: Jul. 27, 1995

§ 102(e) Date: Jul. 27, 1995

[87] PCT Pub. No.: WO94/17973

PCT Pub. Date: Aug. 18, 1994

[30] Foreign Application Priority Data

Feb. 3, 1993 [GB] United Kingdom .................. 9302104

[51] Int. Cl.⁶ ........................................................ B65B 1/04
[52] U.S. Cl. .................... 141/284; 141/12; 141/71; 141/232; 141/67; 366/189; 366/192
[58] Field of Search ........................... 141/12, 71, 72, 141/81, 231, 232, 249, 250, 268, 284, 67; 366/108, 110, 114, 116, 189, 192; 222/161

[56] References Cited

U.S. PATENT DOCUMENTS

| | | | |
|---|---|---|---|
| 2,975,809 | 3/1961 | Ninneman et al. | 141/1 |
| 3,216,464 | 11/1965 | Horst | 141/9 |
| 3,712,347 | 1/1973 | Andersen | 141/12 |
| 3,788,368 | 1/1974 | Geng et al. | 141/71 |
| 4,212,331 | 7/1980 | Benatar | 141/284 |
| 4,310,106 | 1/1982 | Greck et al. | 222/161 |
| 4,550,765 | 11/1985 | Fischer et al. | 141/71 |
| 4,678,015 | 7/1987 | Raque et al. | 141/232 |

FOREIGN PATENT DOCUMENTS

| | | |
|---|---|---|
| 1066221 | 4/1967 | United Kingdom . |
| 2010166 | 6/1979 | United Kingdom . |

OTHER PUBLICATIONS

Patent Abstracts of Japan, vol. 4, No. 72 (M–13) (554) 27 May 1980 "Powder Supplying Method and Powder Supplying Device For Powder Forming Machine" Inventor: Riken K.K.

Primary Examiner—Henry J. Recla
Assistant Examiner—Steven O. Douglas
Attorney, Agent, or Firm—Synnestvedt & Lechner

[57] ABSTRACT

A cavity is charged with particulate material by positioning a predetermined quantity of the material in a box (140). The box has substantially the same horizontal cross-sectional shape as the cavity and is closed at the bottom by at least one door (78) on which the material rests. In order to level the material, the box (140) is moved to and fro horizontally a plurality of times with the energy imparted to the material being progressively reduced during the movements. The door (78) is then opened sufficiently rapidly that the particulate material falls out of the box (140) into the cavity substantially as a unit.

18 Claims, 6 Drawing Sheets

CHARGING CAVITIES

This invention is concerned with charging cavities with particulate material.

In various industries, the requirement exists to charge cavities with particulate material which ideally fills the cavity to a constant depth. The provision of such a level pile is not easy to achieve because particulate material naturally forms an uneven pile if poured into a cavity. This can be alleviated to some extent by complex pouring techniques but this is slow and may be impractical if the cavity is in a confined space, e.g. between the platens of a press. The possibility also exists of over-filling the cavity and skimming off the excess material. This possibility is, however, wasteful of material and may not be possible in a confined space. This solution is also not available where successive layers of particulate material are deposited on top of one another. Where there is more than one type of particle in a charge, it is also difficult to maintain uniformity of distribution during charging with present charging techniques.

It is an object of the present invention to provide an improved method of charging a cavity with a particulate material.

The invention provides a method of charging a cavity with particulate material, the method comprising positioning a predetermined quantity of particulate material in a box which has substantially the same horizontal cross-sectional shape as the cavity, the box being closed at the bottom by at least one door on which the particulate material rests, moving the box to and fro horizontally a plurality of times with movements arranged so that the energy imparted to the material as a result of the movements is progressively reduced during the movements, and removing said door from the box sufficiently rapidly that the particulate material falls substantially as a unit into the cavity.

In a method according to the invention, the to and fro horizontal motion causes the particulate material to form a substantially level pile in the box, i.e. one of constant depth, and this pile is found to fall substantially intact into the cavity. The relatively large quantity of energy applied to the material in the initial movements of the to and fro movement causes larger particles in the material to be distributed across the box while the relatively smaller quantity of energy applied in the later movements does not significantly move said larger particles but distributes any smaller particles. By reducing the energy progressively, the correct amount of energy to distribute each particle size present, is applied at some time during the movements and once distributed said particles are not significantly moved thereafter. The to and fro motion can be performed in the confined space between the platens of a press, and the method can be used to deposit successive layers, each of uniform depth, on top of one another. Furthermore, the to and fro motion is found to achieve a uniform distribution of particles of different types within a charge or layer which is present in the material in the cavity, unlike some known charging methods which create local concentrations of particles of one type. The progressive reduction in energy can be achieved by decreasing the amplitude of the to and fro movements. Alternatively, or additionally, the duration of the movements may be increased.

At least some of the to and fro movements may be separated by pauses, thereby giving the material more settling time before it is moved again. The pauses may last up to one quarter of the duration of the movement preceding it.

The door, or several doors arranged to be moved simultaneously, have to close the entire bottom of the box and be removed sufficiently rapidly that substantially none of the material can fall before the rest. A removal time of about 0.2 seconds has been found to be suitable. The door or doors may be removed by horizontal movement.

The to and fro movements of the box are preferably linear but may alternatively be arcuate, circular or ellipsoidal. In some cases, it may be advantageous to superimpose simultaneous or successive linear to and fro movements at right angles to one another, the frequencies and amplitudes of the two movements may be the same or different. Where the cavity is elongated, the to and fro movement may be parallel to the major axis of the cavity.

There may be 5 to 10 to and fro movements, each having a duration between 1 second and 0.1 seconds. The exact number of movements and the durations thereof, as well as the energy imparted, e.g. by variation of duration or amplitude or both, are selected to suit the particular material.

Provided that the box is not moved too violently to position it, it is found that the to and fro movements can be made before the box is positioned over the cavity which may be advantageous in some circumstances. Alternatively, where the to and fro movements are linear, the positioning movement may be linear at right angles to the to and fro movements or in the same direction as the to and fro movement.

The particulate material may be guided from the box to the cavity, e.g. by a guide having the same horizontal cross-sectional shape as the cavity, or by an air curtain, or by a combination of such a guide and an air curtain.

Where two layers of particulate material of different types, e.g. of different compositions, mixes or particle sizes, are required, the method may also comprise positioning a predetermined quantity of a further particulate material in a further box mounted directly above the first-mentioned box, said further box also having substantially the same horizontal cross-sectional shape as the cavity, the further box being closed at the bottom by at least one further door on which the further particulate material rests, moving the further box to and fro with the first-mentioned box, and removing said further door from said further box, after the first-mentioned particulate material has fallen into the cavity, the further door being removed sufficiently rapidly that the further particulate material falls substantially as a unit through the first-mentioned box into the cavity on top of the first-mentioned particulate material.

The invention also provides apparatus for use in charging a cavity with particulate material, the apparatus comprising a box arranged to receive a predetermined quantity of particulate material, the box having substantially the same horizontal cross-sectional shape as the cavity, at least one door movable between a closed position thereof, in which it closes the bottom of said box and particulate material in the box rests on the door, and an open position thereof, in which it allows particulate material to fall out through the bottom of the box, box moving means operable to move the box and the door in its closed position to and fro horizontally a plurality of times with movements arranged so that the energy imparted to material in the box as a result of the movements is progressively reduced during the movements, and door moving means operable to move the door from its closed to its open position sufficiently rapidly that particulate material in the box falls through the bottom thereof substantially as a unit.

The box moving means may be operable to move the box to and fro along a linear track, e.g. defined by rollers.

The door moving means may be operable to move the door along a horizontal track.

The apparatus may also comprise guidance means acting to guide the particulate material from the box to the cavity. The guidance means may comprise a plurality of downwardly-directed orifices arranged around the path taken by the particulate material, and means for directing air through said orifices to create an air curtain around said path. The guidance means may also comprise, additionally or alternatively, a vertically-extending guide having the same horizontal cross-sectional shape as the cavity and the box.

The apparatus preferably comprises a hopper acting to guide particulate material into said box. The apparatus may also comprise catching means acting to catch any of the particulate material which escapes from the charge as it falls from the box. Extraction means may also be provided to remove material from the catching means.

The apparatus may also comprise further box moving means operable to move the box and the door in its closed position in a similar manner to the first-mentioned box moving means, ie to and fro horizontally, a plurality of times with movements arranged so that energy imparted to material in the box is progressively reduced, but at right angles to the movement caused by the first-mentioned box moving means. Thus, the material can be distributed both away and across the box.

The apparatus may also comprise a further box fixedly mounted relative to the first-mentioned box and directly above it, the further box also having substantially the same horizontal cross-sectional shape as the cavity and being arranged to receive a predetermined quantity of second particulate material, at least one further door movable similarly to the first-mentioned door but in relation to the further box, and further door moving means operable to move the further door from its closed to its open position sufficiently rapidly that particulate material falls through the bottom of the further box substantially as a unit.

The apparatus may also comprise positioning means operable to position the box at a particulate material receiving station and subsequently above a cavity. The box moving means may operate during the operation of the positioning means.

The invention may be utilised with particulate material made up of plastics, metal or other materials, including material containing elongated particles. Once in the cavity, the particles may be subjected to heat and/or pressure to form them into an article or a preform for further treatment.

There now follows a detailed description, to be read with reference to the accompanying drawings, of an apparatus; which is illustrative of the invention in its apparatus aspects, and of its method of operation which is illustrative of the invention in its method aspects.

The illustrative apparatus 2 (shown in FIGS. 6 and 7) is for use in charging a cavity (not shown) with particulate material. In this case, the cavity has a rectangular horizontal cross-section. The apparatus 2 comprises a carrying assembly 10 shown in FIGS. 1 to 3 and an assembly of boxes 100 shown in FIGS. 4 and 5 which are mounted on the carrying assembly 10 in a manner to be described.

The carrying assembly 10 comprises a vertically-extending mounting plate 12 on which the remainder of the assembly 10 is mounted. The plate 12 is provided with vertically elongated holes 14 (FIG. 3) through which clamping screws (not shown) can be passed to clamp a first surface 16 of the plate 12 against a carriage 17 which can be moved linearly. Moving the carriage 17 moves the assembly 10 between a first particulate material receiving station 4, a second particulate material receiving station 6, and a particulate material delivering station 8 above the cavity.

The assembly 10 also comprises a bracket 18 clamped to the surface 16 of the plate 12. The bracket 18 carries a motor mounting plate 20 on which an electric motor 22 is mounted. The motor 22 is a brushless servo-motor which has a resolver or an encoder (not shown) associated therewith to provide feedback of the angular position of the output shaft 24 of the motor 22. The output shaft 24 (FIG. 2) projects through a hole in the plate 20 and has an arm 26 fixedly mounted thereon so that operation of the motor 22 causes the arm 26 to turn about the axis of the output shaft 24. A programmable control system (not shown) is associated with the motor 22 to control it to make predetermined turns of the output shaft 24.

The opposite surface 28 of the mounting plate 12 to the surface 16 thereof carries four rollers 30, each on a mounting 31 clamped to the plate 12. Each roller 30 can turn about a horizontal axis thereof. The rollers 30 are arranged with two at the same upper level and two at the same lower level and define a horizontal linear track. The surface 28 defines a horizontally-extending clearance groove 32 which is midway between the upper rollers 30 and the lower rollers 30. A horizontally-extending slot 34 passes through the plate 12 within the groove 32.

Figure 1:
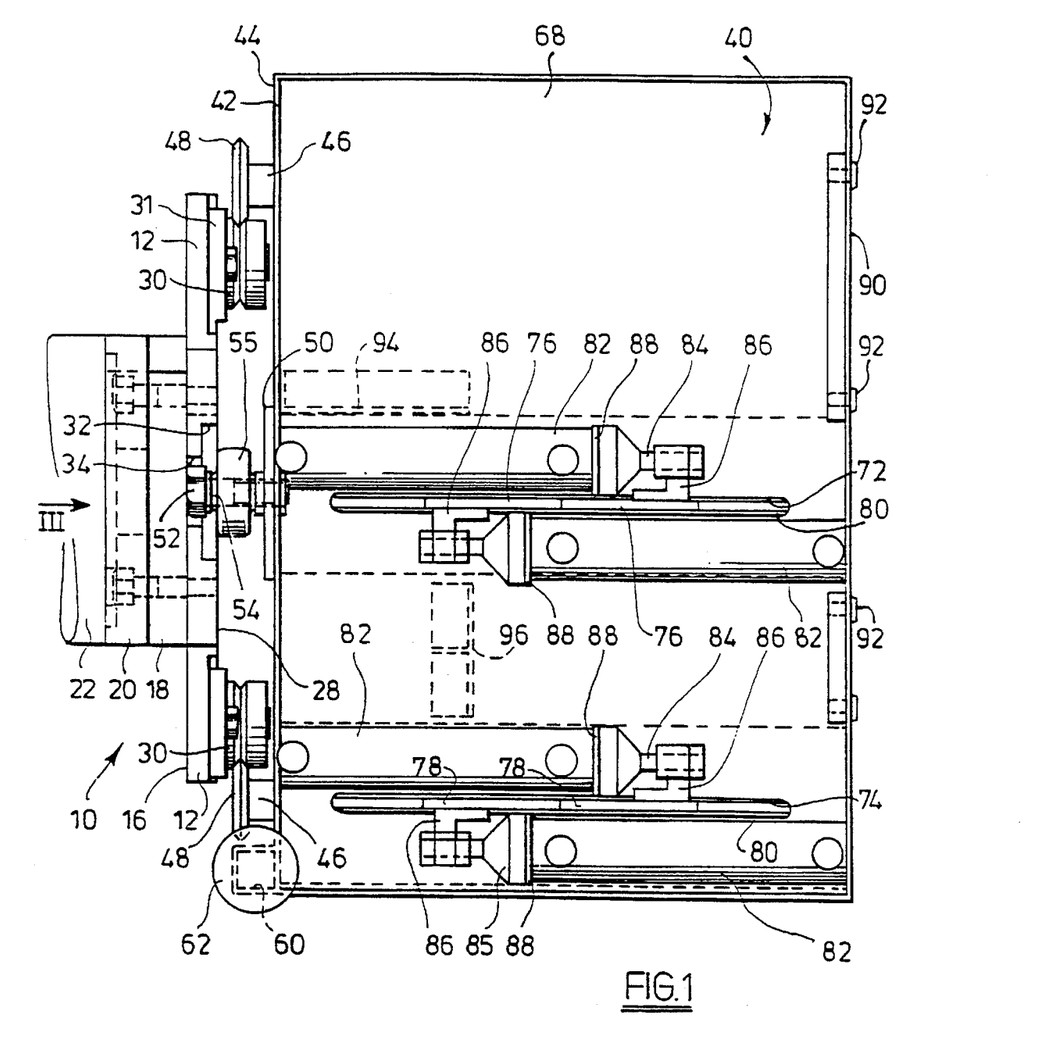
FIG. 1 is a side elevational view of a carrying assembly of the illustrative apparatus.

The assembly 10 also comprises a support 40 which is mounted on the four rollers 30 for reciprocating movement along the track defined by the rollers 30 by the action of the motor 22. The support 40 comprises a vertically-extending back plate 42 which has a rear surface 44 facing the surface 28 of the mounting plate 12. Mounted on the rear surface 44 are a lower and an upper horizontally-extending bracket 46. Each bracket 46 carries a horizontally-extending rail 48. The upper rail 48 is above the upper rollers 30 and has a lower surface which is V-shaped and is received in corresponding V-shaped grooves in the two upper rollers 30. The lower rail 48 is below the lower rollers 30 and has an upper surface which is V-shaped and is received in corresponding V-shaped grooves in the two lower rollers 30. The upper rail 48 supports the support 40 and the lower rail 48 guides the support 40 during reciprocating horizontal motion parallel to the surface 28 along the track defined by the rollers 30. The surface 44 also carries a boss 50 which is mid-way between the two brackets 46. The boss 50 has a pin 52 secured thereto which projects horizontally into the clearance slot 34 in the mounting plate 12 (FIG. 1). The pin 52 carries a ball joint 54.

In order to enable the motor 22 to move the support 40, the ball joint 54 is connected by a link 55 to a ball joint 56 (FIG. 2) carried by a pin 58 which projects horizontally from the arm 26 on the output shaft 24 of the motor 22. The pin 58 is spaced from the output shaft 24 so that operation of the motor 22 causes the link 55 to move the support 40. The link 55 extends along the clearance groove 32 in the plate 12 and is adjustable in length by a left and right-handed screw thread arrangement.

At its lower edge, the back plate 42, on its surface 44, carries an extractor pipe 60 provided with a connecting flange 62. The pipe 60 extends horizontally from a hole 64 through the plate 42 with which the pipe 60 connects. The plate 42 also carries a connector 66 for an air supply. The connector 66 is close to the hole 64 and also connects with a hole (not shown) through the plate 42.

The support 40 also comprises left and right vertically-extending side plates 68 and 70 which are formed integrally with the back plate 42 which they meet at right angles. The side plates 68 and 70 project away from the plate 12. The plates 68 and 70 are generally similar to one another so that only the left side plate 68 need be described in detail (similar parts associated with the right side plate 70 are given the same reference numerals).

The left side plate 68 has two horizontally-extending slits therethrough, an upper slit 72 and a lower slit 74. The upper slits 72 allow end portions of a pair of horizontally-extending upper doors 76 to pass through the plates 68 and 70, each door passing through a slit in both plates. The doors 76 are provided by thin metal sheets with a non-stick coating on their upper surfaces and extend across the space between the side plates 68 and 70. The lower slits 74 allow end portions of a lower pair of doors 78 similar to the doors 76 to pass through the plates 68 and 70. The doors 76 and 78 are slidable along horizontal tracks defined by rails 80 mounted adjacent to the slits 72 and 74 on the inside surfaces of the plates 68 and 70. The doors 76 and 78 can slide horizontally between a closed position, in which each door engages the other door of the pair along an edge thereof, and an open position, in which these doors are separated. In FIG. 1, the doors 76 and 78 are shown in their closed positions and, in FIG. 2, the doors 76 are shown close to their closed positions.

In order to move the doors 76 and 78 between their open and closed positions, the support 40 comprises eight pneumatic piston and cylinder assemblies 82. The assemblies 82 are mounted on the outside surfaces of the plates 68 and 70 with each assembly 82 acting on one end of one of the doors 76 and 78. Each assembly 82 extends horizontally and has a piston rod 84 carrying a crosshead 85 which is fixed to a bracket 86 which is also fixed to one of the doors 76 and 78. Each assembly 82 carries a rubber cushion 88 arranged to cushion the impact when the doors 76 and 78 are moved to their closed positions. The assemblies 82 provide door opening means operable to move the doors 76 and 78 from their closed to their open positions and back again.

The doors 76 and 78 are operated by supplying air under pressure to the assemblies 82. The assemblies 82 associated with the doors 76 are operated together as are the assemblies associated with the doors 78 but the doors 76 can be operated independently of the doors 78 and vice versa. The assemblies 82 are arranged so that extending the piston rods 84 moves the doors to their open positions whereas retracting them moves the doors to their closed positions at which point the crossheads 85 engage the cushions 88. The assemblies 82 are arranged to move the doors 76 or 78 from their closed positions to their open positions in about 0.2 seconds.

The lowermost edges of the side plates 68 and 70 are turned inwards to provide shelves (not shown) and the vertical edges away from the back plate 42 are turned outwardly to provide flanges 90 which support threaded fixing points 92. The side plates 68 and 70 are also connected by two beams 94 and 96 which are disposed closer to the back plate 42 than to the flanges 90.

Figure 2:
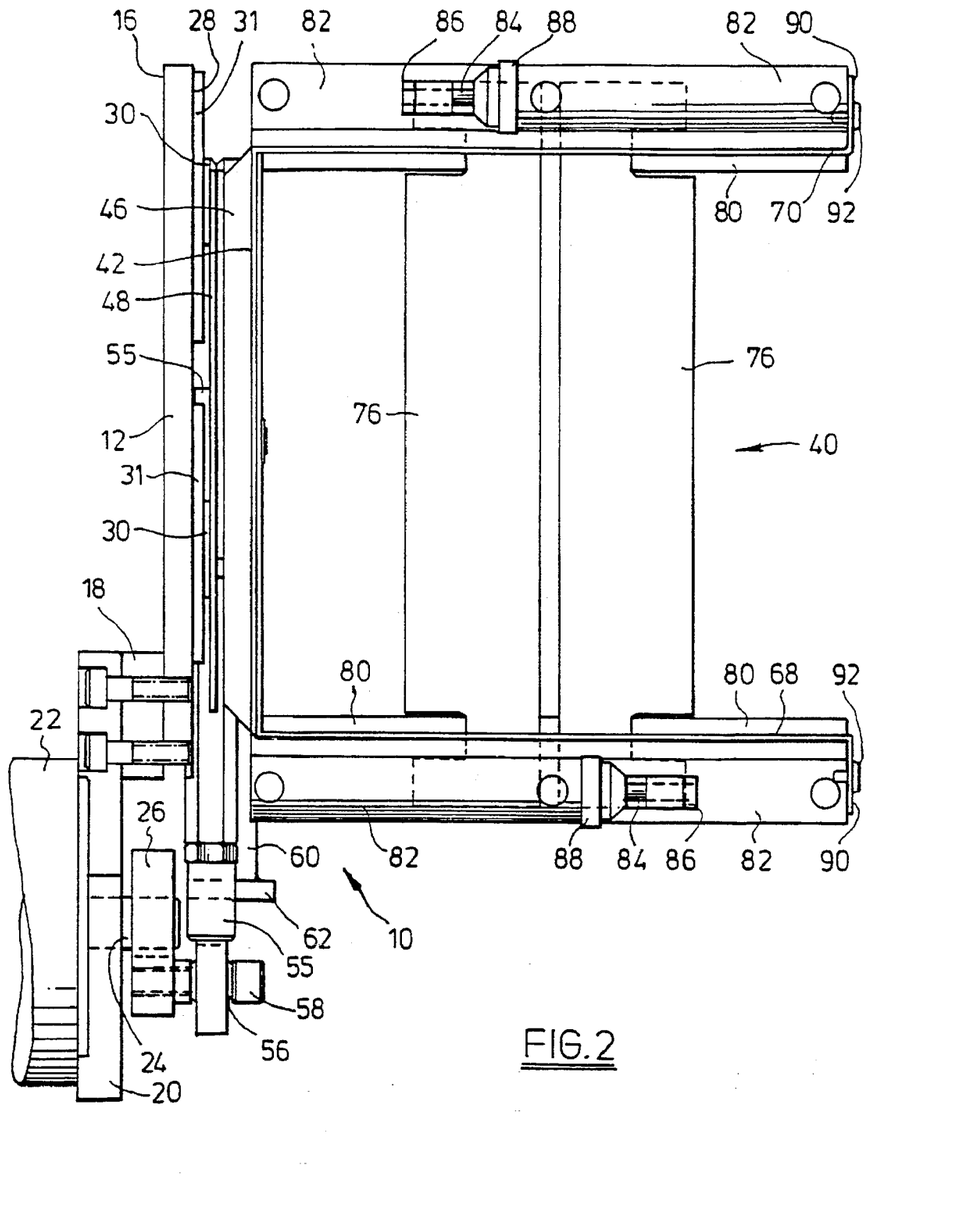
FIG. 2 is a plan view of the assembly shown in FIG. 1.
Figure 3:
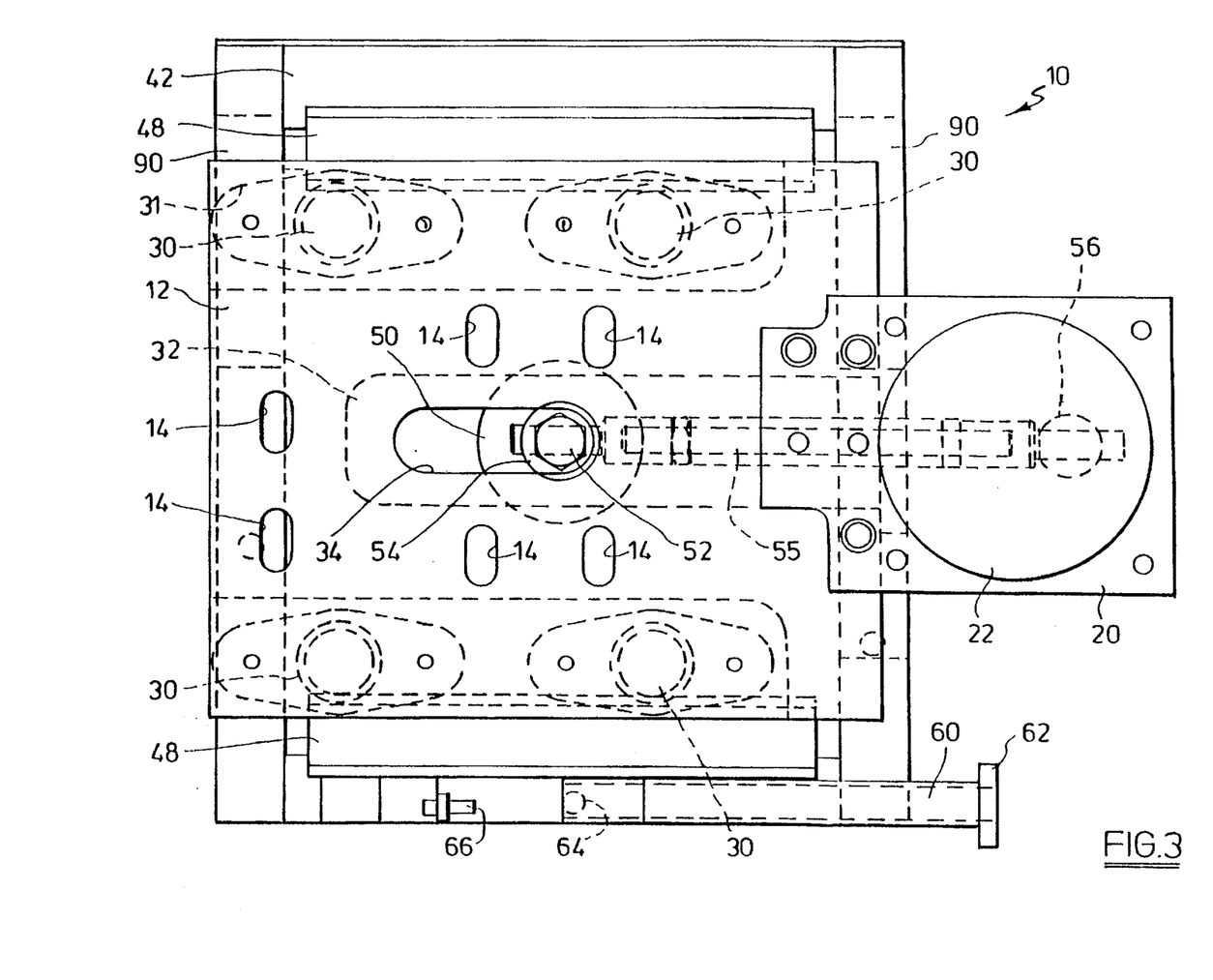
FIG. 3 is an elevational view, on a slightly smaller scale, taken in the direction of the arrow III in FIG. 1.
Figure 4:
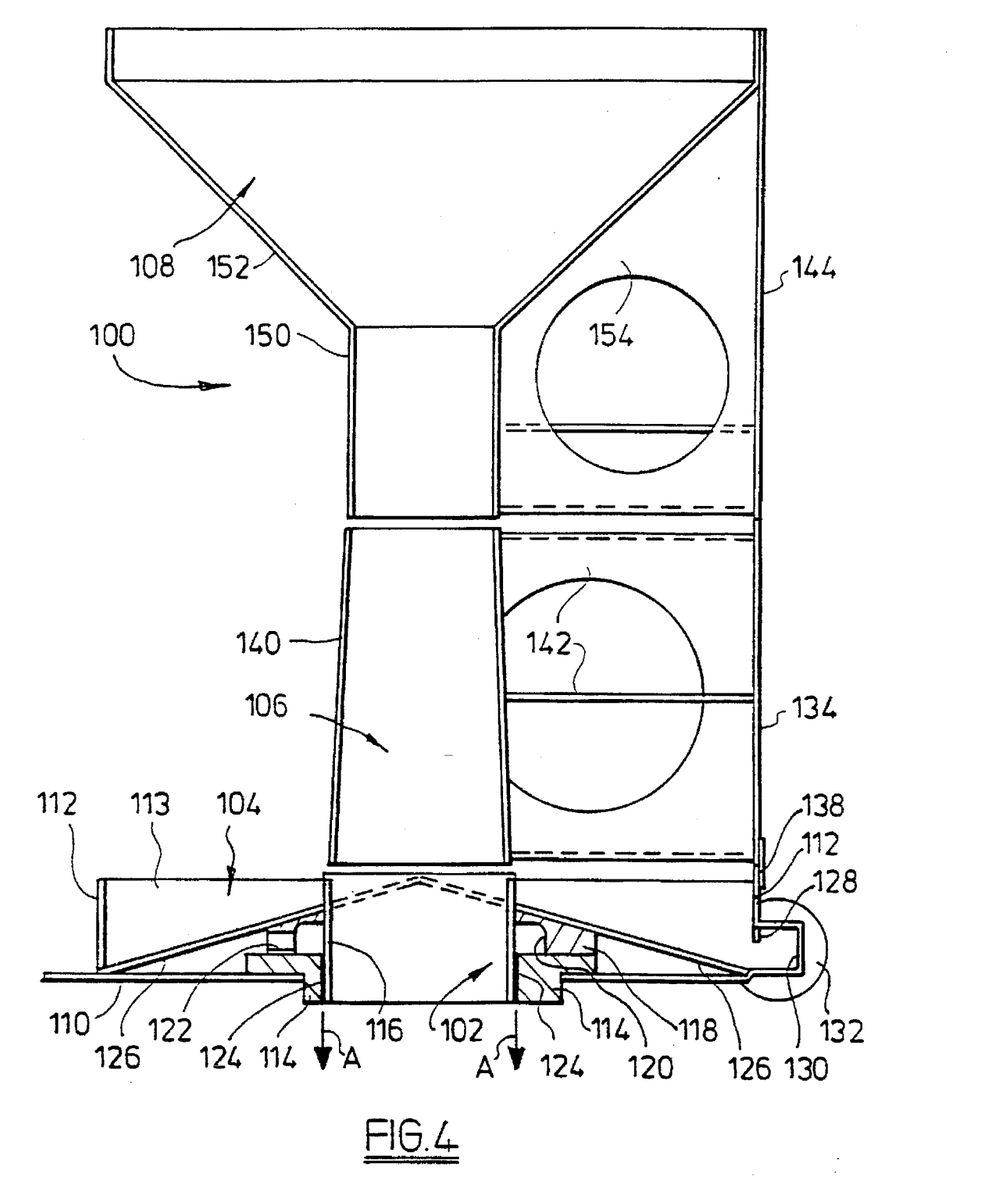
FIG. 4 is a vertical cross-section taken through an assembly of boxes of the illustrative apparatus for mounting on the carrying assembly shown in FIGS. 1 to 3.
Figure 5:
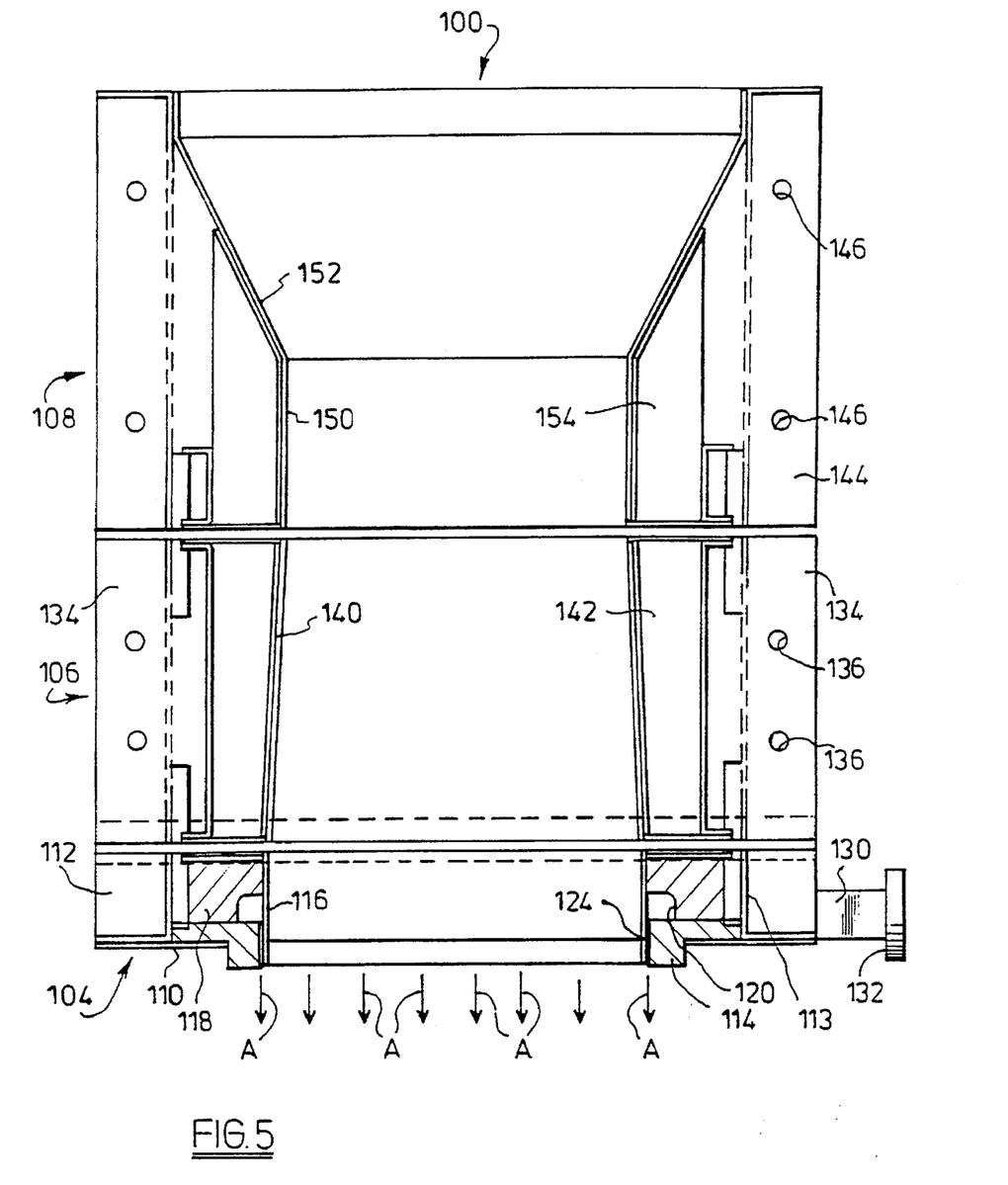
FIG. 5 is a vertical cross-section taken through the assembly shown in FIG. 4 but taken at right angles to the direction of view of FIG. 4.

The support 40 is arranged to support three units of the box assembly 100 which are not shown in FIGS. 1 to 3 but are illustrated in FIGS. 4 and 5. The assembly 100 is one of a number of alternative assemblies which can be mounted on the support 40, the assemblies differing in the cross-sectional shape of a central vertical passage 102 therethrough whose shape is determined by the shape of the cavity.

The assembly 100 comprises a lower unit 104, a centre unit 106 and an upper unit 108. The units 104, 106 and 108 are constructed of sheet material and are disposed one above the other on the support 40.

The lower unit 104 comprises a horizontal base plate 110 on top of which an open-topped box is formed by vertical front and back plates 112 and two vertical side plates 113 so that the plate 110 forms a bottom of the box. The base plate 110 has a central hole therethrough in which a stepped block 114 is received. This block 114 defines a rectangular vertical passage in which a box 116 is mounted. The box 116 is open at the top and the bottom and is formed of four vertically-extending plates. The box 116 forms a lower part of the passage 102 and has a horizontal cross-sectional shape and size which are identical to those of the cavity. The box 116 forms part of guidance means of the apparatus acting to guide particulate material into the cavity. A further block 118 is mounted on top of the block 114 and extends around the box 116. The block 118 is cut-away to provide a small plenum chamber 120 extending around the box 116 and enclosed by the blocks 114 and 118, and by a portion of the outer surface of the box 116. The plenum chamber 120 has an entrance 122 through the block 118. The entrance is connected by pipes (not shown) to a connector (not shown) which plugs into the connector 66 mounted on the support 40 so that air can be supplied to the plenum chamber 120. The plenum chamber 120 has a large number of exits formed by narrow vertical bores 124 in the block 114. These bores 124 have exits spaced around the lower entrance of the passage 102 which is formed by the lower periphery of the plates forming the box 116. When the plenum chamber 120 is supplied with air, air passes out of the bores 124 and forms a curtain of air (indicated by the arrows A) which extends downwardly from the passage 102. The air curtain co-operates with the box 116 in forming guidance means to guide particulate material. The exits of the bores 124 provide a plurality of downwardly-directed orifices arranged around the path taken by the particulate material, and the plenum chamber 120 provides means for directing air through said orifices to create the air curtain A around said path.

The unit 104 also comprises inclined plates 126 which are mounted within the box formed by the plates 112 and 113 and around the box 116. The plates 126 have their upper ends abutting the box 116 above the block 118 and their lower ends are at the junctions of the base plate 110 and the plates 112. The inclined plates 126 direct particulate material which escapes from the passage 102 into gutters formed by the junction of the inclined plates 126 and the front and back plates 112. The gutter formed adjacent the back plate 112 is connected by a plug (not shown) to the hole 64 into the extractor pipe 60 when the unit 104 is on the support 40. The other gutter is connected by a hole 128 to the interior of an extractor pipe 130. The pipe 130, which is provided with a connecting flange 132, extends horizontally along the outside surface of the front plate 112. The plates 112, 113 and 126, thus, form catching means of the apparatus acting to catch any particulate material which escapes as it passes through the assembly 100. The pipes 60 and 130 provide extraction means to remove material from the catching means.

The unit 104 is mounted on the support 40 by being slid horizontally between the side plates 68 and 70 so that it rests on the shelves formed by the upturned lower edges of the plates 68 and 70. The upper periphery of the box 116 is then just below the lower doors 78. Mounting the unit 104 on the support 40 connects the air supply to the plenum chamber 120 and the extraction pipe 60 to the rear gutter.

The centre unit 106 is mounted between the lower doors 78 and the upper doors 76 by means of a vertical front plate 134 which engages both the flanges 90 and is bolted thereto through holes 136, the bolts entering four of the threaded fixing points 92. The unit 106 clears the beam 96. The plate 134 has a downward projection 138 which acts to retain the lower unit 104 on the support 40. The unit 106 also comprises a box 140 which is made from four generally vertically-extending plates. The box 140 has an open bottom which is the same shape and size as the open top of the box 116 of the lower unit 104 with which it is aligned so that the box 140 defines a central section of the passage 102. The box 140 tapers inwardly, slightly, towards its top which is also open. The box 140 is supported by struts 142 mounted on the front plate 134.

The box 140 is arranged to receive a predetermined quantity of particulate material, through its open top, when the doors 76 are in their open positions. The box 140 has substantially the same horizontal cross-sectional shape as the cavity and as the box 116. When in their closed positions, the lower doors 78 close the bottom of the box 116 so that particulate material in the box 140 rests on the doors 78.

The upper unit 108 is mounted on the support 40 above the upper doors 76 by means of a vertical front plate 144 which engages both flanges 90 and is bolted thereto by bolts entering four of the fixing points 92 through holes 146. The unit 108 clears the beam 94. The unit 108 also comprises a box 150 and a hopper 152 mounted above the box 150. The box 150 and the hopper 152 are made from four plates each supported by the front plate 144 by means of struts 154. The plates forming the box 150 are vertical and the box has an open bottom which is just above the doors 76 and is the same shape as the open top of the box 140 of the centre unit 106. The box 150 forms an upper section of the passage 102. The top of the box 150 is open and communicates with the bottom of the hopper 152. The plates of the hopper 152 incline outwardly in the upwards direction so that the open top of the hopper is larger than its open bottom.

The box 150 provides a further box of the apparatus fixedly mounted on the support 40 relative to the box 140 and directly above it. The box 150 has substantially the same horizontal cross-sectional shape as the cavity and is arranged to receive, through its open top, a predetermined quantity of a second particulate material which rests on the doors 76 when they are in their closed positions in which they close the bottom of the box 150. The doors 76 and their associated assemblies 82 act in the same way in relation to the box 150 as do the doors 78 and their associated assemblies 82 in relation to the box 140.

The hopper 152 acts to guide particulate material dropped into its upper end into the box 150. The hopper 152 guides not only a second particulate material which is destined for the box 150, but also a first particulate material which is destined for the box 140, this material passing through the box 150 to reach the box 140.

The apparatus 2 also comprises a further servo-motor 160 (FIG. 7) which provides both positioning means operable to position the boxes 140 and 150 at the stations 4, 6 and 8 and also a further box moving means operable to move the boxes 140 and 150 in the same way as the motor 22 but at right angles to the movement caused by the motor 22.

Figure 6:
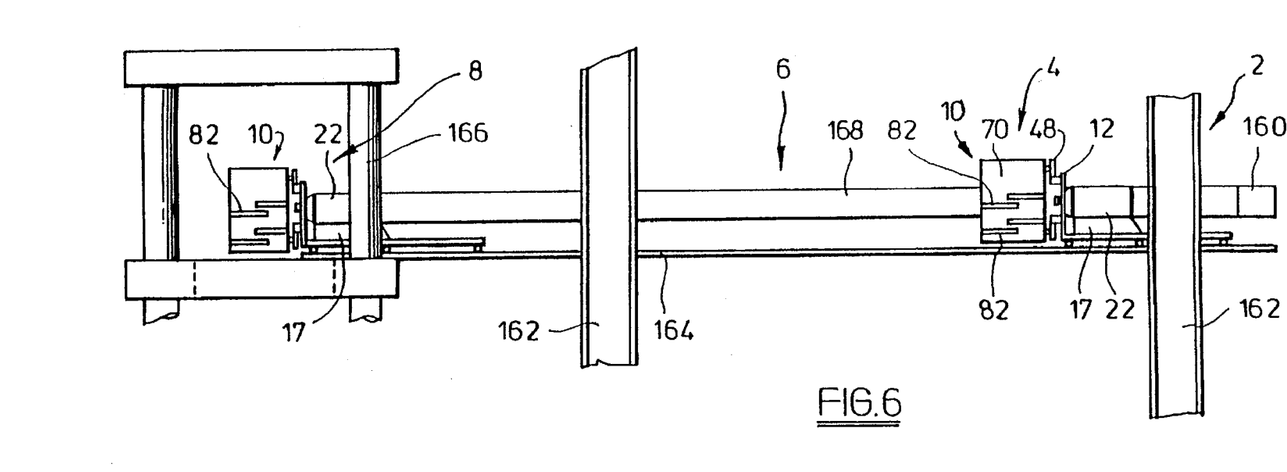
FIG. 6 is a diagrammatic side elevational view of the illustrative apparatus, showing the assembly of boxes mounted on the carrying assembly in two positions.
Figure 7:
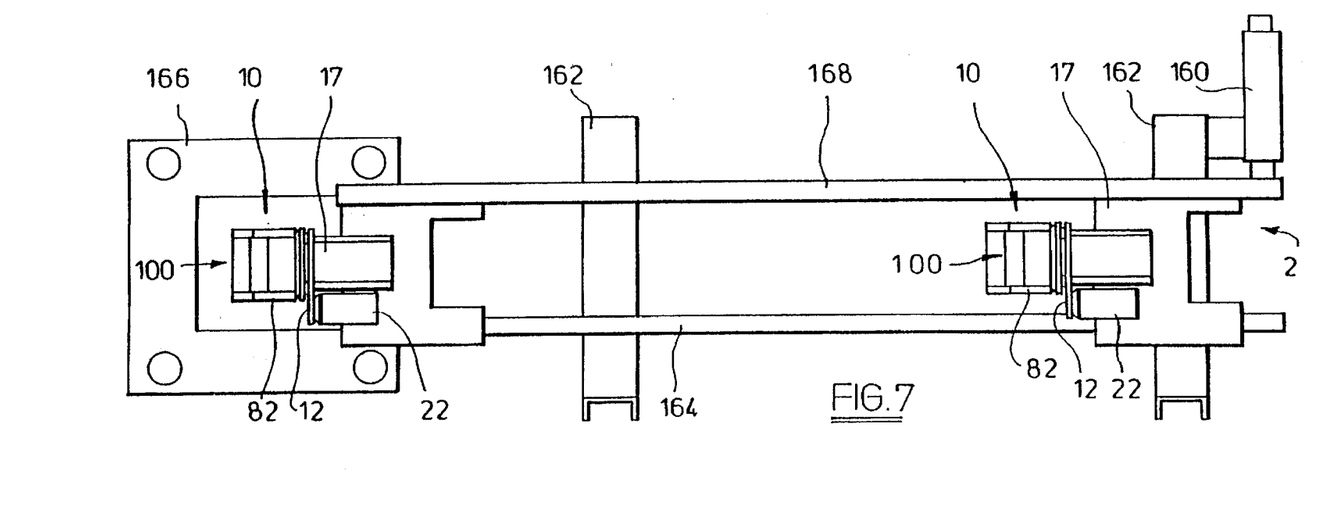
FIG. 7 is a diagrammatic plan view of the illustrative apparatus shown in FIG. 6.

The motor 160 is mounted on a framework 162 of the apparatus 2 which also supports two horizontal rails 164 (only one visible in the drawings). The rails 164 extend from the receiving station 4 to the receiving station 6 and from there to the delivery station 8 at which there is a press 166. The carriage 17 runs on the rails 164 so that the boxes 140 and 150 can be positioned at the stations 4, 6 and 8 (although the apparatus 2 has only one carriage 17, it is shown in FIGS. 6 and 7 at both the stations 4 and 8). The framework 162 also supports a ball screw 168 by which the carriage 17 is driven along the rails 164. The ball screw 168 is operated by the motor 160.

In the operation of the illustrative apparatus 2 by the illustrative method, a predetermined quantity of a first particulate material is positioned in the box 140 and a predetermined quantity of a second particulate material is positioned in the box 150. This is achieved by operating the motor 160 to move the assembly 100 to the first receiving station 4, where it is beneath a weigh cell operable to weigh a predetermined quantity of the first particulate material. Then, with the upper doors 76 open and the lower doors 78 closed, the weighed material is dropped into the top of the hopper 152. The first particulate material is guided by the hopper 152 into the box 150 and falls down into the box 140 where it rests on the doors 78. The assembly 100 is then moved by operation of the motor 160 to the second receiving station 6, where it is beneath a second weigh cell and the piston and cylinder assemblies 82 are operated to close the upper doors 76. The second weigh cell is operable to weigh a predetermined quantity of the second particulate material. The weighed quantity of the second material is dropped into the top of the hopper 152 and is guided into the box 140 where it rests on top of the upper doors 76.

The assembly 100 is now moved to the delivering station 8 between the platens of the press 166 above the cavity, and the motors 22 and 160 are operated to level the particulate material. The motor 22 provides box moving means of the apparatus operable to move the boxes 140 and 150 and their doors 78 and 76 (in the closed positions) to and fro horizontally along the linear horizontal track defined by the rollers 30. This is achieved by turning the output shaft 24 through an arc of 180° or less so that the arm 26 turns and moves the link 55 along the groove 32. The movement of the link 55 causes the support 40 and all parts mounted thereon to move relative to the mounting plate 12 with the rails 48 running on the rollers 30. The to and fro movements are arranged so that the energy imparted to the material in the boxes 140 and 150, as a result of the movements, is progressively reduced during the movements. This is achieved by the signals of the control system to the motor 22 causing each successive arcuate turn of the output shaft 24 to be through a smaller angle. The amplitude of the to and fro movements of the boxes 140 and 150 is, thus, progressively reduced. The first movement may be caused by a 180° turn of the motor, the second by a 162° turn in the opposite direction, the third by a 149° turn in the first direction, and so on. Eight to and fro movements are made, i.e. sixteen movements in total, which are of progressively decreasing amplitude. In the first movement, the particulate materials have a relatively large amount of energy imparted thereto and in each subsequent movement the energy imparted is less. These to and fro movements are found to produce a level pile of particulate material in each of the boxes 140 and 150 and, where there are different types of particle in the material, these types are found to be well-distributed in the piles.

If the shape of the cavity is such that the levelling movements imparted by the motor 22 are insufficient, further levelling movements can be applied (at right angles) by operating the motor 160 to oscillate the carriage 17 along the rails 164 with an energy decreasing oscillation.

If the passage 102 is not exactly aligned with the cavity after the to and fro movements, the boxes 140 and 150 are moved into this position by gentle movements of the assembly 10. The air supply to the plenum chamber 120 is now turned on creating a curtain of air extending downwardly from the box 116 to the mould cavity. The assemblies 82 are now operated to open the lower doors 78. The doors 78 are, thus, removed from the box 140 sufficiently rapidly that the first particulate material falls substantially as a unit into the cavity. The doors 78 are moved horizontally along the rails 80. The first particulate material falls through the box 116 into the mould cavity being guided by the box 116 and the air curtain. Next, the assemblies 82 are operated to rapidly open the upper doors 76. Like the doors 78, the doors 76 and removed sufficiently rapidly that the second particulate material falls out of the bottom of the box, in this case the box 150, substantially as a unit. The second particulate material falls through the boxes 140 and 116 into the mould cavity being also guided by the box 116 and by the air curtain. The second particulate material lands on top of the first particulate material. The material is found to arrive in the mould cavity substantially in the same level state and distribution in which it was in the boxes 140 and 150. Any particulate material which escapes into the gaps between the boxes 140 and 150, and the boxes 140 and 116 falls into the gutters and is extracted through the pipes 60 and 130.

We claim:

1. A method of charging a cavity with particulate material, the method comprising positioning a predetermined quantity of particulate material in a box which has substantially the same horizontal cross-sectional shape as the cavity, the box having an open bottom closed by at least one door on which the particulate material rests, moving the box containing the particulate material to and fro horizontally with respect to said cavity a plurality of times with movements arranged so that the energy imparted to the material as a result of the movements is progressively reduced during the movements, and removing said door from said open bottom of said box sufficiently rapidly that the predetermined quantity of particulate material falls substantially as a unit into the cavity.

2. A method according to claim 1, characterised in that the energy is reduced by decreasing the amplitude of the to and fro movements.

3. A method according to claim 1, characterised in that the energy is reduced by increasing the duration of the to and fro movements.

4. A method according to claim 1, characterised in that at least some of the to and fro movements are separated by pauses.

5. A method according to claim 1, characterised in that the door is removed by a horizontal movement thereof.

6. A method according to claim 1, characterised in that the to and from movements of the box are linear.

7. A method according to claim 1, characterised in that the to and fro movement are made before the box is positioned over the cavity.

8. A method according to claim 1, characterised in that the particulate material is guided from the box to the cavity.

9. A method according to claim 1, characterised in that the method also comprises positioning a predetermined quantity of a further particulate material in a further box mounted directly above the first-mentioned box, said further box also having substantially the same horizontal cross-sectional shape as the cavity, the further box being closed at the bottom by at least one further door on which the further particulate material rests, moving the further box to and fro with the first-mentioned box, and removing said further door from said further box, after the first-mentioned particulate material has fallen into the cavity, the further door being removed sufficiently rapidly that the further particulate material falls substantially as a unit through the first-mentioned box into the cavity on top of the first-mentioned particulate material.

10. Apparatus for use in charging a cavity with particulate material, the apparatus comprising a box arranged to receive a predetermined quantity of particulate material, the box having substantially the same horizontal cross-sectional shape as the cavity, at least one door movable between a closed position thereof, in which it closes the bottom of said box and particulate material in the box rests on the door, and an open position thereof, in which it allows particulate material to fall out through the bottom of the box, box moving means operable to move the box and the door in its closed position to and fro horizontally with respect to said cavity a plurality of times with movements arranged so that the energy imparted to material in the box as a result of the movements is progressively reduced during the movements, and door moving means operable to move the door from its closed to its open position sufficiently rapidly that said predetermined quantity of particulate material in the box falls through the bottom thereof substantially as a unit.

11. Apparatus according to claim 10, characterised in that the box moving means is operable to move the box to and fro along a linear track.

12. Apparatus according to claim 10, characterised in that the door moving means is operable to move the door along a horizontal track.

13. Apparatus according to claim 10, characterised in that the apparatus also comprises guidance means acting to guide the particulate material from the box to the cavity.

14. Apparatus according to claim 13, characterised in that the guidance means comprises a plurality of downwardly-directed orifices arranged around the path taken by the particulate material, and means for directing air through said orifices to create an air curtain around said path.

15. Apparatus according to claim 10, characterised in that the apparatus also comprises a hopper acting to guide particulate material into said box.

16. Apparatus according to claim 10, characterised in that the apparatus also comprises further box moving means operable to move the box and the door in its closed position in a similar manner to the first-mentioned box moving means but at right angles to the movement caused thereby.

17. Apparatus according to claim 10, characterised in that the apparatus also comprises a further box fixedly mounted relative to the first-mentioned box and directly above it, the further box also having substantially the same horizontal cross-sectional shape as the cavity and being arranged to receive a predetermined quantity of a second particulate material, at least one further door movable similarly to the first-mentioned door but in relation to the further box, and further door moving means operable to move the further door from its closed to its open position sufficiently rapidly that particulate material falls through the bottom of the further box substantially as a unit.

18. Apparatus according to claim 10, characterised in that the apparatus also comprises positioning means operable to position the box at a particulate material receiving station (4) and subsequently above a cavity.

* * * * *